Oct. 7, 1941.  A. E. BOWEN  2,257,783

GUIDED WAVE TRANSMISSION

Filed Sept. 21, 1939  2 Sheets-Sheet 1

INVENTOR
A. E. BOWEN
BY
ATTORNEY

Oct. 7, 1941.   A. E. BOWEN   2,257,783
GUIDED WAVE TRANSMISSION
Filed Sept. 21, 1939   2 Sheets-Sheet 2

INVENTOR
A. E. BOWEN
BY
H. A. Burgess
ATTORNEY

Patented Oct. 7, 1941

2,257,783

UNITED STATES PATENT OFFICE 2,257,783

GUIDED WAVE TRANSMISSION

Arnold E. Bowen, Red Bank, N. J., assignor to Bell Telephone Laboratories, Incorporated, New York, N. Y., a corporation of New York Application September 21, 1939, Serial No. 295,901

14 Claims. (Cl. 178—44)

This invention relates to the transmission and reception of electromagnetic waves, and more particularly to the reception of ultra-high frequency electromagnetic waves transmitted through free space or through dielectric guides, such as evacuated metallic pipes or pipes containing dielectrics such as air.

It has been shown heretofore how certain kinds of electromagnetic waves can be generated in pipes and launched for propagation in free space or for propagation through the interior of a metallic pipe containing a dielectric medium if the frequency exceeds a critical frequency related to the transverse dimensions of the pipe. In practical systems of this kind there is need for efficient launching of a wave and for efficient coupling between the guide and the wave receiving means or load.

In the case of propagation through a dielectric guide a form of guide that lends itself well to the purpose in hand is one consisting of a metallic pipe evacuated or filled with air and it is in terms of such a guide that my invention will be described. It is to be understood, however, that this is for illustrative purposes only and that the invention is applicable to other forms of guides and to freely launched waves.

Dielectrically guided waves are capable of transmission in an indefinitely large number of forms or types, each type being distinguished by the characteristic special distribution and interrelation of the component electric and magnetic fields comprising the wave, and each type differing specifically from other types in certain transmission characteristics that are important with respect to the objects of this invention.

Although there are an indefinite number of types of these waves, it has been found that they fall into either of two broad classes. In one class, assuming for the sake of simplicity that the guide is in the form of a metallic pipe, the electric component has both a transverse and a longitudinal component whereas the magnetic has a transverse component only, while in the other class the magnetic component has a transverse and a longitudinal component whereas the electric has a transverse component only. The first of these will be indicated by the notation $E_{nm}$ and the latter by $H_{nm}$ where the subscripts $n$ and $m$ refer respectively to the order and the mode of the type. On another basis the types may be classified as symmetric or asymmetric, the first being characterized by being substantially circularly symmetrical in relation to an axis lying in the direction of propagation and the other by the fact that a receiver of the wave must be aligned in a preferred direction for most effective reception.

Reference may be made to my copending application, Serial No. 133,810, filed March 30, 1937, which issued on November 21, 1939 as U. S. Patent No. 2,180,950, for a brief description of some of the simpler forms of waves as they may exist in a hollow cylindrical conductor. Such waves can be transmitted in free space or in guides of a circular cross-section or in circular guides divided into sectors by longitudinal partitions suitably disposed with respect to the lines of electromotive intensity. Also, in much the same way that electromagnetic waves of different types can exist inside of hollow conducting guides of circular cross-section, they can exist in guides of other cross-sections. In guides of square or rectangular cross-section the waves are of a notably simpler appearance and their properties are characterized by quite simple formulae.

In my application referred to above I describe at length methods and means whereby a wave of one type may be converted to another type, conversion being controlled in accordance with desired changes. It will be readily understood, however, that in many instances due to localized or distributed and unpremeditated or accidental irregularities in the wave guide there may be some conversion, usually undesired, from one type to another or there may be changes in the plane of polarization of some types of waves. Such conversions or changes may lead to falling off in efficiency of reception, which for some types of receivers may be quite substantial.

The object of this invention is to provide means whereby a high efficiency of reception is maintained in spite of such conversions or changes. A further object is to provide means by which certain types of distortion may be corrected, thus increasing the efficiency of reception. A further object is to so connect a plurality of receiving devices to its terminal apparatus as to improve the coupling between the various parts of a guided wave system and the receiving devices and to render each receiver efficient for a particular component of a received wave and independent of each other receiver and to combine the output of the separate receivers in a useful manner. The invention has reference to the reception more particularly of asymmetric waves, of which there is an indefinite number of types, but it will be described in terms of the $H_{11}$ type for simplicity and because of the ease with which this type of wave can be visualized. It is to be understood, however, that the invention is not limited to this type of wave.

The invention will be better understood by reference to the following specification and accompanying drawings, in which.

Figure 1:
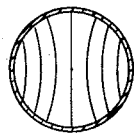
Fig. 1 is a cross-section of a guide showing the electric field for one type of wave.

Referring more particularly to the $H_{11}$ type of wave attention may be called to patent to King 2,088,749, August 3, 1937 and patent to King and Bowen 2,151,118, March 21, 1939 which disclose a number of receivers for this type and other types of waves. As pointed out in my copending application, these are waves in which, as shown in Fig. 1, the electric intensity at a point in the path of the wave is transverse and varies in magnitude, but not in direction, with time. Also, as pointed out above, it has been found that in transmitting an $H_{11}$ wave initially of linear polarization over a hollow wave guide with minor imperfections, the wave appearing at the far end of the guide is not always linearly polarized. In fact, frequently it may be elliptically polarized to a greater or less extent. It would be expected also that in transmission by a radio path a wave initially of linear polarization in a given plane might suffer reflections or other distortions so that the wave arriving at the receiver would not be linearly polarized or would have its plane of polarization changed.

In speaking of polarization of electromagnetic waves reference will be made hereafter only to that aspect identified as the electric field, although the magnetic fields also vary according to the state of polarization of the wave.

It is well known that any elliptically polarized wave can be considered as the resultant of two mutually perpendicular linearly polarized waves having, in general, unequal amplitudes and displaced in time phase by 90 degrees. Thus we can suppose that at the receiving terminal of a wave guide line there arrives not a single elliptically polarized wave but two linearly polarized $H_{11}$ waves of unequal amplitude and displaced in time phase by 90 degrees. If, now, a receiver adapted to the reception of linearly polarized $H_{11}$ waves only is provided, at best it can absorb only the energy transmitted by one of the two components and the energy brought in by the second component would ordinarily be reflected back to the line and wasted. Particularly in the case of radio transmission it might very well happen that the properties of the path would change from time to time so that the direction of the major axis of the ellipse in which the electric force in the wave is polarized would vary. Thus, with a receiver adapted only for the reception of linearly or plane polarized waves, not only would some power be lost but it would be necessary to rotate the receiver so as to keep it lined up with the larger component of received field. It is to avoid such difficulties that the receivers described herein have been devised.

Figure 2:
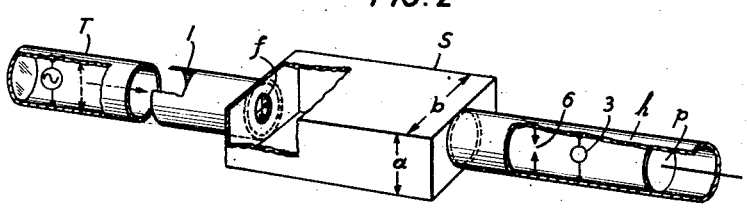
Fig. 2 shows one form which my invention may take.

In Fig. 2 there is shown a transmitter T adapted for launching any desired type of wave, such as an $H_{11}$ wave. Whether launched as a plane or an elliptically polarized wave the received wave may, in general, have suffered changes. The simplest case to consider, at this point, is that in which the received wave is elliptically polarized, consisting of two components at right angles to each other and differing in time phase by 90 degrees. The resultant effect can be represented by an ellipse in which the major axis is parallel to one side of a box S, as shown at $f$ of Fig. 2, i. e., the ellipse has no tilt with respect to the box. Other cases will be considered later. At the receiving end the guide, which may be circular in cross-section, connects to the box or section S which is rectangular in cross-section, having dimensions $a$ and $b$. As already mentioned, the received wave may be considered as made up of two components polarized in planes at right angles to each other. It is characteristic of a rectangular guide section of the form shown, however, that a wave with its electric vector parallel to one side will be propagated with a different velocity from that if parallel to the other and after passage through an appropriately chosen length the two entering components will be brought into time phase with each other, giving a resultant plane polarized wave, but one in which the vectorial resultant electric field is not parallel to either side of the box. This property of a rectangular guide is discussed in my Patent 2,129,669, September 13, 1938, wherein methods for converting a plane polarized wave into an elliptical wave or the reverse is disclosed. This property of a rectangular box is analogous to double refraction, or "birefrangence," in optical phenomena and, for convenience, such a box will be referred to as a "birefrangent box." In Fig. 2 the length of the section S is so adjusted as to bring about a plane polarized wave which will then enter the circular guide section $h$, the latter containing a receiving device 3 so oriented as to be in line with the electric component of the received wave. In order to increase the efficiency of reception the section $h$ will be provided with an iris 6 and a metallic piston $p$, the relative spacing of the elements being such as will be described in further detail in connection with Figs. 3 and 4. Whether the elliptical polarization of the incoming wave is incident to the form of the intially launched wave or to changes due to accidental irregularities along the transmission path, the system will be efficient for reception of all the incoming wave energy.

Figure 3:
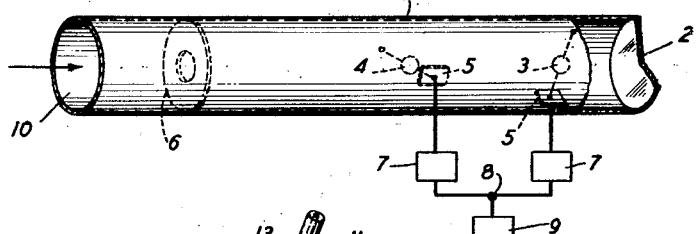
Figs. 3 to 7 are other forms which my invention may take.
Figure 11A:
Figure 11B:
Figure 11C:

In Fig. 3 there is shown another receiver adapted for the reception of elliptically polarized $H_{11}$ waves without regard to the plane of the major axis of the ellipse. In a hollow conductor chamber 1, bounded at one end by a transverse reflecting wall 2, are located two identical power absorbers or sinks 3 and 4 functioning as receivers or detectors. These receivers may assume any of the forms which have already been described as receivers for linearly polarized $H_{11}$ waves. The receivers are connected in conductors which extend across mutually perpendicular diameters, as shown in Fig. 3, and are separated longitudinally by a distance substantially equal to an integral number of half wave-lengths of the wave to be received. It is to be noted that the wave-length here referred to is the wave-length in the guide and not the so-called free space wave-length. At one of their ends the conductors containing the sinks or receivers 3 and 4 are connected to the wall of the guide and at the other end to small stopping condensers 5 of a form useful in connection with dielectrically guided waves and described in connection with Fig. 11 and elsewhere in patent to Southworth 2,142,159, January 3, 1939.

At a suitable distance from the receiver 4 there is located an iris 6 which functions in the manner described in connection with Fig. 22a of the said patent to Southworth. Continuing to the left, the guide section terminates in an open end 10 which may be provided with a suitable adapter whereby the assembly may be connected to a wave guide line or a horn, or other appropriate combination.

It is now well known in this art that if a linearly polarized wave is applied to the assemblage of Fig. 3 with its direction of polarization lined up with the receiver 3, then by suitable adjustment of distances from reflector 2 to receiver 3 and from the reflector to iris 6 and adjustment of the aperture of the iris 6, the impedance of the receiving device can be made to match that of the guide so that all of the incident power is absorbed. Furthermore, since the receiver 4 and the wire into which it is connected are in an equipotential plane for this wave it will absorb none of the power. If, however, the direction of polarization of the incident wave is rotated through 90 degrees, other things being left unchanged, and if the receiver 4 is identical to 3 and is located one-half wave-length from it, then the receiver 4 is also matched to the line and accepts all of the incoming energy in its plane of polarization. Furthermore, if the direction of polarization of the incident wave is intermediate to the cases considered, it can be resolved into two $H_{11}$ waves, the one lined up with receiver 3 and the other with receiver 4 and each receiver accepts its component without reflection so that the entire wave is absorbed without reflection. This will be true whatever the state of polarization—linear or elliptical—of the incident wave, for such a wave can always be resolved into two linearly polarized components, the one lined up with one receiver and the other with the other receiver and each receiver lies in a null plane of the other.

The outputs of the receivers are conducted from condensers 5 through insulating bushings in the walls of the guide through suitable phase shifters and amplifiers 7 to junction 8 where the outputs are combined and supplied to load 9.

Fig. 3 shows a receiver of a very simple form. In practice it may be difficult to obtain two identical power sinks or receivers 3 and 4 so that the adjustments suitable for matching to the wave guide line would not be the same for both. This can be taken care of by the construction of Fig. 4 where the arrangement is the same as in Fig. 3 except for two coaxial tuning elements 11 which have been substituted for the iris of Fig. 3. The central conductors 12 of these coaxials extend across diameters of the guide 1, the one being parallel to receiver 3 and the other to receiver 4. Each is independently tunable by piston 13. The use of such tuning coaxials in dielectric wave guides is described in patent application of A. P. King, Serial No. 188,841, filed February 5, 1938 and which issued as U. S. Patent 2,232,179, February 18, 1941. In many cases it would be desirable to provide arrangements by which the receivers 3 and 4 and the coaxials 11 can be moved axially along the guide. Such adjustability of one element or another in dielectric guides is discussed in the said application of King. It should be pointed out that if such adjustability is supplied, then the receivers 3 and 4 need not have the same impedance for they can be matched independently to the line and thereafter the combination will absorb all the energy brought by a wave with any degree of ellipticity.

Figure 5:
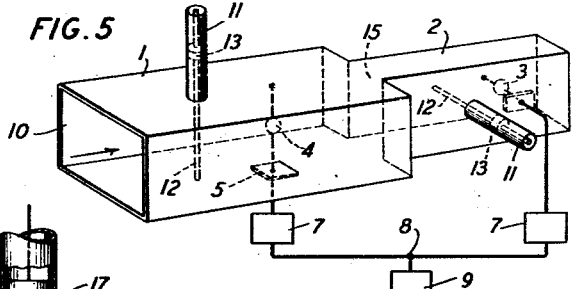

Still another receiver for elliptically polarized waves, whether such ellipticity is present in the original wave or is produced accidentally or intentionally in the transmission path, is shown in Fig. 5. This arrangement also has the advantage of not requiring identical receivers. Here the wave enters a square guide 1 at end 10, at which point the guide may be supplied with an adapter for connection to a wave guide line or other appropriate apparatus. The sides of the square section are somewhat longer than a half wave-length (free space wave-length). In the square section there are disposed a power absorbing device 4 and a tunable coaxial 11. At 15 one dimension of the guide is decreased abruptly to a value considerably less than one-half wave-length, the other dimension remaining unchanged. Then, as is disclosed in my Patent 2,129,669, the component of the entering wave which is polarized in a direction parallel to receiver 4 cannot enter the rectangular guide beyond 15 so that 15 acts effectively as a perfect reflector for waves in this polarization. By suitably adjusting the distance from 15 to 4, from 4 to 12, and the position of the coaxial tuning piston, the impedance of 4 can be matched to the line. The wave component linearly polarized in a direction perpendicular to 4 passes 12 and 4 without reflection and by virtue of the unchanged width of the rectangular section 2 enters this section with but little reflection at junction 15. What reflection exists at the junction can be compensated in the process of matching receiver 3 to the line.

Figure 4:
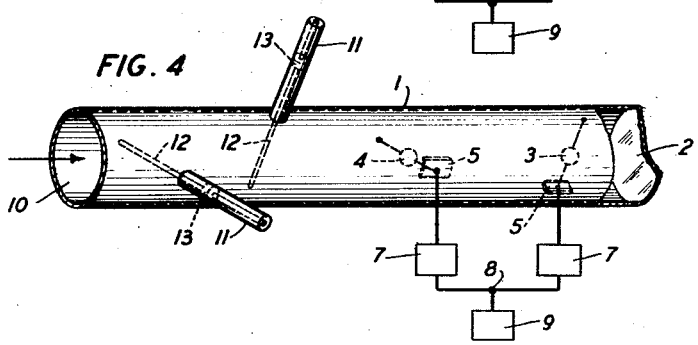
Figure 6:
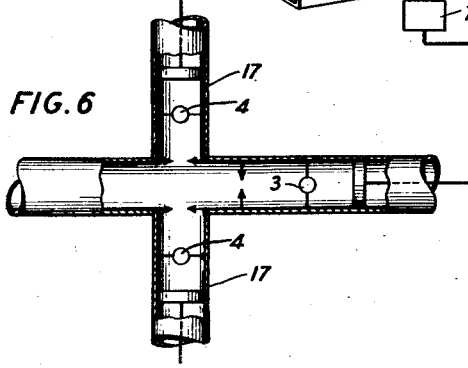

Still a further modification of the invention is shown in Fig. 6, in which one of the components of the received wave is absorbed by the receiver 3. The other component passes into one or more side tubes 17, each containing suitable receivers 4, adapted to absorb the energy from the other component. The chamber for each receiver is adjusted to transmit its own component only and provisions similar to that for Figs. 3 to 5 are provided to match each receiving chamber to the component which it is to receive and to combine the outputs of the receivers.

Figure 7:
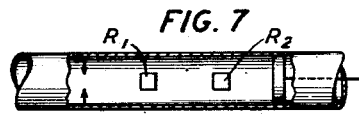

While the invention has been described primarily in terms of distortion in which the distortion consists of a wave of the same type as the main transmitted wave, it is to be understood that in some cases the distortion component may consist of a type of wave other than the type initially launched. In this case it will frequently be desirable to use a type of receiver especially adapted for the distortion component. Such an arrangement is shown schematically in Fig. 7, in which the receivers are indicated by $R_1$ and $R_2$. The two receivers will be so disposed with respect to each other in the receiving terminal that they are conjugate with respect to each other and each is adjusted for impedance matching to the guide in a manner similar to that described in Figs. 3 to 5.

In connection with Fig. 2, the use of a birefrangent box S is described for a simple case. Other possibilities are present, however, and these are described in connection with Figs. 8a to 11c. In the portion a of each of these figures the condition of the wave when it arrives at the incoming end of the box is shown. The condition of the wave as it reaches the further end c of the box, with no change in orientation of the box, and is ready to enter the circular section is shown at b of each of these figures. The preferred orientation to be given to the box and to the receiver in the circular section in the light of this is shown at c in each figure.

Figure 8A:
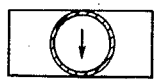
Figs. 8a to 11c illustrate certain features applicable to an extension of the invention.
Figure 8B:
Figure 8C:
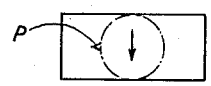

In connection with these figures it may be remarked that it is well known (1) that the resultant of any two plane polarized $H_{11}$ waves arriving at the receiver is equivalent to an elliptically polarized wave; (2) that the electric intensity in an elliptically polarized wave can be resolved into two plane polarized waves, the one with its plane parallel to the major axis of the ellipse representing the wave and the other parallel to the minor axis with a time phase difference of 90 degrees between them. (3) In order to bring the two components into time phase, it is sufficient to have the length of the birefrangent box such that there is a 90 degree phase difference between the paths of the two components. It then becomes evident that the adjustment of the device under consideration requires two steps only: (a) to rotate the box until one of its sides is parallel to one of the axes of the ellipse, either major or minor, so that the wave will be converted from the elliptical to plane polarization in passing through the box and (b) to rotate the receiver to line up with the plane polarized wave issuing from the box. Fig. 8a refers to the simple case in which the incoming wave is plane polarized with its plane parallel to one side of the birefrangent box. Since there is no component at right angles thereto this wave will arrive at c in the same condition and the orientation of the box and the receiver is that shown in Fig. 8c. For such a case the birefrangent box performs no particularly useful function.

Figure 9A:
Figure 9B:
Figure 9C:

The wave, however, may arrive at a elliptically polarized with the major axis parallel to one side of the box, as indicated in Fig. 9a. This is the condition described in connection with Fig. 2. As there pointed out, the length of the box S will be such that the two components will arrive at c in time phase and the resultant is plane polarized. The orientation of the receiver is that indicated in Fig. 9c by the pointer P.

Figure 10A:
Figure 10B:
Figure 10C:

It may be that the wave arrives at a as a plane polarized wave but with its plane rotated through an angle, indicated in Fig. 10a. With that particular orientation of the box the wave will arrive at c as an elliptically polarized wave, indicated in Fig. 10b, and this is an undesirable condition. If, however, the box is rotated through such an angle as to make the shorter side parallel to the plane of polariztaion of the incoming wave, then the wave will pass through it without production of elliptical polarization but in that case the plane of the receiver should also be rotated to be lined up with the wave. This is indicated in Fig. 10c where the pointer P shows the orientation of the receiver.

Still another condition is that in which the distortion component is other than 90 degrees in time phase from the main wave. In that case there will be elliptical polarization but the plane of the major axis will be tilted so that the wave again could be represented by an ellipse, as in Fig. 11a, but the ellipse will be tilted. On passage through the birefrangent box with normal orientation, each of the components would be modified and the wave would take on the form represented in Fig. 11b, which in general will still be a tilted ellipse. It is apparent, then, that by rotating the box S so that one of the sides is parallel to the major axis of the ellipse of Fig. 11a, the effect of the box will be to produce a plane polarized wave as in Fig. 11c but in that case the receiver should also be rotated so as to be aligned with the plane of polarization of the wave falling upon it.

Figure 12:
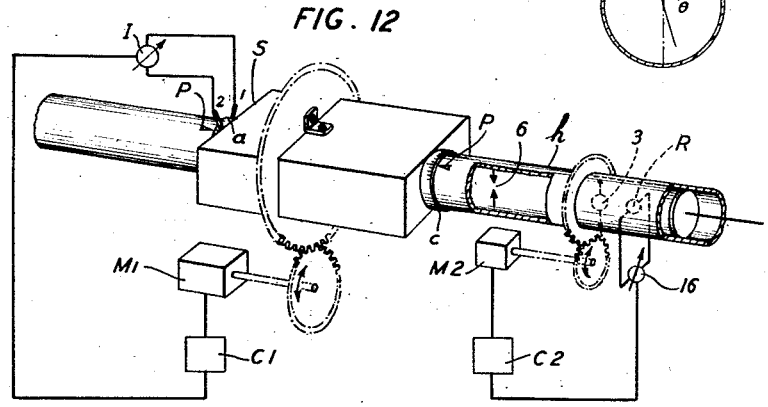
Fig. 12 is a modification of Figs. 2 to 7.

In general, then, it will be seen that since the changed form of the incoming wave will usually be unknown, it will be desirable in some cases to rotate the box a certain amount and to also rotate the receiver. The question as to whether there should be such rotation and the amount of the rotation could be determined by trial, and in practice the matter of finding the most favorable angle of orientation is not a particularly difficult one. Provision should be made, however, for independent orientation as shown in Fig. 12, in which only one receiver 3 is necessary, as in Fig. 2.

If the distortion is a fixed and permanent one, then the adjustment may be made once for all but in some cases, especially those in which the wave is transmitted through free space, such permanence is not characteristic and alterations would be necessary from time to time. These may be made manually by trial, making use of an additional probe receiver R if desired.

Figure 13:
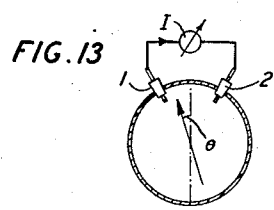
Fig. 13 is a detail relating to Fig. 12.

An automatic adjustment will, in some cases, be useful. Provision, therefore, is shown in Fig. 12, in which motors $M_1$ and $M_2$ are connected by suitable gears to rotate the box S and the receiver 3, the latter being accomplished either by rotating the receiver element itself or by rotating the guide section h. For such automatic adjustment it is evident there must be some indicator responsive to an undesirable condition, so controlling the motors as to bring the elements into the most favorable orientation. For this purpose the detailed arrangements of Fig. 12 may be used. A better understanding of this figure may be obtained by reference to Fig. 13 which shows the cross-section of a circular guide into which two identical probes or detectors 1 and 2 are inserted for sampling the $H_{11}$ wave in the circular guide. The direct current outputs from these probes are connected in opposition through a meter I. If the guide is so rotated that there is an angle θ between the plane of polarization of the $H_{11}$ wave and the median plane between the detectors, then the output from 1 is greater than from 2 and current is in the direction shown by the arrow. If the guide is rotated so that θ equals zero, the current in I becomes zero and if θ becomes negative the current is reversed. If the incoming wave were elliptically polarized, the amplitude of the current in I between the points of zero reading and recording at 90 degree angles would be smaller as the wave approached circular polarization, but the zero positions would always be present. Such a system of probe detectors may be attached to the input side of the box S and the current flowing through the meter I would then be used to control the motor $M_1$ of Fig. 12 to rotate the box until one of its sides is parallel to the direction of the major axis of the ellipse. Having brought the box into proper orientation, it is then necessary to bring the receiver 3 into proper orientation. This latter may be accomplished by use of the second receiver R, again used essentially as a probe, its plane being at right angles to or in a null plane of receiver 3. In case a component of a wave is received at R, then a current will flow through a responsive element 16 such as a relay, which in turn through control $C_2$ will cause the motor $M_2$ to rotate until the component received at R becomes zero.

Obviously, other variations of these particular arrangements can be devised.

While the invention has been described largely in terms of the $H_{11}$ type of wave, it is to be understood that this is for illustrative purposes only and that it is equally applicable in the case of any type of asymmetric wave in which there is elliptical polarization inherent in the launched wave or in which there is a change in polarization, or there is production of elliptical polarization during transmission over the transmission path.

What is claimed is:

1. In a dielectric guide wave system, means for launching guided waves therein, a receiver at a receiving point adapted and oriented for reception of a particular type of launched wave, a second receiver so oriented as to be receptive to a distortion component of the wave generated during transmission along the guide system, and means for combining the outputs of said receivers in mutually aiding relation.

2. The combination of claim 1 characterized by the fact that the receivers are so spaced with respect to each other and to the elements of the guide that each receiver is independent of the other.

3. The combination of claim 1 characterized by the fact that the receivers are so spaced with respect to each other and to the elements of the guide that each receiver is independent of the other and is adjusted for impedance matching to the guide system.

4. In a wave transmission system a wave guide, a transmitting terminal with means for launching a guide wave, said wave being subject to distortion in transmission over the wave guide, a receiving terminal, a plurality of receivers therein, each adapted to receive a separate component of the received wave, the receivers being positioned so as to be conjugate with respect to each other, reflecting elements and reactive elements associated with the terminal, each adjusted and positioned to yield maximum response of each receiver to its component of the transmitted wave.

5. In a dielectric wave guide system, means for launching an $H_{11}$ wave therein, the wave being subject to irregular changes of the plane of polarization during transmission over the guide, a linear receiver at the receiving end so oriented as to efficiently receive said wave with its normal plane of polarization, a second receiver placed at a point to be independent of the first receiver and in a plane at right angles to the first receiver, tuning means associated with the receiving end for independently adjusting each receiver for impedance matching to the guide system.

6. In a wave transmission system, a wave guide, a receiving terminal comprising a metallic wave guide with a reflecting end, a receiver for the waves adapted to receive the particular type of wave being transmitted, the receiver being spaced from the reflecting end at a point of maximum variation of the electric field, a tunable coaxial tuning element spaced and adjusted with respect to the receiver for impedance matching to the guide system, a second receiver spaced substantially an integral number of half-wave-lengths from the first receiver, a second tunable coaxial tuning element positioned and adjusted with respect to the second receiver so as to produce no reaction on the first receiver but to produce impedance matching of the second receiver to the guide system.

7. The combination of claim 5 characterized by the fact that the two receivers lie in planes at right angles to each other and the said tuning means lie in planes at right angles to each other.

8. A receiving terminal for dielectrically guided waves comprising two series guide sections, one adapted to transmit a complex wave and the other adapted to transmit one component only of said wave and to reflect another component, a receiver in the first section so positioned and adjusted as to be efficiently responsive to the reflected component, a second receiver in the second section so positioned and adjusted as to be efficiently responsive to the transmitted component, and means for additively combining the received power of the two receivers.

9. The combination of claim 8 characterized by the fact that each section has tunable means for independently adjusting each receiver to maximum efficiency and to impedance matching to an incoming wave guide.

10. In a terminal for ultra-short asymmetric electromagnetic waves, said waves comprising two components polarized in different planes and said wave components bearing substantially identical signals, a receiver placed in the null plane for one component and a receiver placed in the null plane for the other component, and a common signal output circuit for said receiver.

11. In a dielectric wave guide system, means for launching an $H_{11}$ wave therein, the wave being subject to irregular changes resulting in elliptical polarization during transmission, a linear receiver at the receiving end so oriented as to efficiently receive a wave with a particular plane of polarization, a birefrangent section associated with the receiver to bring the total energy of the received wave into a plane of polarization coincident with the plane of the receiver.

12. The combination of claim 11 characterized by the fact that the birefrangent section can be rotated about its axis to most favorable orientation for the incoming wave.

13. In a dielectric wave guide system, means for launching an $H_{11}$ wave therein, the wave being subject to irregular changes resulting in elliptical polarization during transmission, a linear receiver at the receiving end so oriented as to efficiently receive a wave with a particular plane of polarization, a birefrangent section associated with the receiver to bring the total energy of the received wave into a preferred plane of polarization, means for rotating the birefrangent box and for rotating the plane of the receiver element independently of each other about their axes to most favorable orientation for the incoming wave.

14. The combination of claim 13 characterized by means whereby the orientation of the birefrangent box end of the receiver is brought about automatically.

ARNOLD E. BOWEN.